US012409862B2

(12) United States Patent
Gilbert-Eyres et al.

(10) Patent No.: US 12,409,862 B2
(45) Date of Patent: Sep. 9, 2025

(54) SYSTEM AND METHOD FOR OPTIMIZING USER PICKUP FOR AN AUTONOMOUS VEHICLE

(71) Applicant: GM GLOBAL TECHNOLOGY OPERATIONS LLC, Detroit, MI (US)

(72) Inventors: Matthew E. Gilbert-Eyres, Rochester Hills, MI (US); Adam L. Wright, Livonia, MI (US); Matthew Neely, Rochester, MI (US); Eric T. Hosey, Rochester Hills, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 18/323,639

(22) Filed: May 25, 2023

(65) Prior Publication Data

US 2024/0391500 A1   Nov. 28, 2024

(51) Int. Cl.
*B60W 60/00* (2020.01)
*B60W 30/06* (2006.01)
*G06Q 30/0201* (2023.01)
*G06Q 10/1093* (2023.01)

(52) U.S. Cl.
CPC ....... *B60W 60/00253* (2020.02); *B60W 30/06* (2013.01); *B60W 2420/403* (2013.01); *B60W 2540/00* (2013.01); *G06Q 10/1095* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 10,685,416 B2 * | 6/2020 | Tolkin | G01C 21/3438 |
| 2013/0132102 A1 * | 5/2013 | Andrade | G06Q 50/40 |
| | | | 705/1.1 |
| 2015/0339928 A1 * | 11/2015 | Ramanujam | G06Q 10/00 |
| | | | 701/23 |
| 2017/0169535 A1 * | 6/2017 | Tolkin | G01C 21/3438 |
| 2018/0211541 A1 * | 7/2018 | Rakah | G06Q 10/047 |
| 2018/0304926 A1 * | 10/2018 | Ghose | B62D 15/0285 |
| 2018/0357906 A1 * | 12/2018 | Yaldo | G08G 1/202 |
| 2020/0124428 A1 * | 4/2020 | Hamilton | G06Q 10/02 |
| 2021/0209713 A1 * | 7/2021 | Imtiyaz | G06Q 50/40 |
| 2022/0221867 A1 * | 7/2022 | Taveira | G05D 1/617 |
| 2022/0309925 A1 * | 9/2022 | Schwendimann | |
| | | | B60W 60/0025 |
| 2023/0014995 A1 * | 1/2023 | Sharma | H04N 21/4415 |

(Continued)

*Primary Examiner* — Rachid Bendidi
*Assistant Examiner* — Nada Mahyoob Alqaderi
(74) *Attorney, Agent, or Firm* — Quinn IP Law

(57) ABSTRACT

A method of operating an autonomous vehicle. The method includes collecting user data regarding a user of the autonomous vehicle and analyzing the user data to assign a pickup score to the user for determining when to relocate the autonomous vehicle from a first parking location. The autonomous vehicle is directed to relocate from the first parking location when the pickup score exceeds a predetermined threshold. A second parking location and a parking position are determined for the autonomous vehicle at a pickup location based on the user data when relocating the autonomous vehicle to pick up the user.

20 Claims, 4 Drawing Sheets

(56) References Cited

U.S. PATENT DOCUMENTS

2023/0311697 A1* 10/2023 Lu ........................ H04W 4/021
                                                              701/22
2024/0011778 A1* 1/2024 Colijn ...................... G08G 1/22

* cited by examiner

SYSTEM AND METHOD FOR OPTIMIZING USER PICKUP FOR AN AUTONOMOUS VEHICLE

INTRODUCTION

The present disclosure relates to a system and a method for picking up a user of an autonomous vehicle.

Autonomous vehicles include sensors, such as lidar, radar, and cameras, operable to detect vehicle operation and the environment surrounding the vehicle, and a computing device operable to control aspects of vehicle operation. Autonomous vehicles generally employ a vehicle navigation system integrated with vehicle controls, drive-by-wire systems, vehicle-to-vehicle communication, and/or vehicle-to-infrastructure technology to identify vehicle position and navigate the vehicle.

Typically, a vehicle navigation system uses a global positioning system (GPS) to obtain its position data, which is then correlated to the vehicle's position relative to a surrounding geographical area. Based on the GPS signal, when directions to a specific waypoint are needed, routing to such a destination may be calculated, thereby determining a vehicle path. Specifically, the vehicle sensors and the computing device may cooperate to identify intermediate way points and maneuver the vehicle between such way points to maintain the vehicle on the selected path. The vehicle may also need to locate parking while a user of the vehicle is running errands.

SUMMARY

Disclosed herein is a method of operating an autonomous vehicle. The method includes collecting user data regarding a user of the autonomous vehicle and analyzing the user data to assign a pickup score to the user for determining when to relocate the autonomous vehicle from a first parking location. The autonomous vehicle is directed to relocate from the first parking location when the pickup score exceeds a predetermined threshold. A second parking location and a parking position are determined for the autonomous vehicle at a pickup location based on the user data when relocating the autonomous vehicle to pick up the user.

Another aspect of the disclosure may be where directing the autonomous vehicle to relocate from the first parking location when the pickup score exceeds a predetermined threshold includes parking the autonomous vehicle at an intermediate parking location within a buffer parking zone prior to parking the autonomous vehicle at the pickup location.

Another aspect of the disclosure may include directing the autonomous vehicle to relocate from the intermediate parking location to the second parking location when an updated parking score is assigned to the user that exceeds a predetermined pickup threshold.

Another aspect of the disclosure may be where determining the second parking location and the parking position for the autonomous vehicle is based on identifying at least one user's need or at least one predetermined user preference.

Another aspect of the disclosure may be where the at least one user's need is determined automatically by monitoring the user data collected.

Another aspect of the disclosure may be where monitoring the user data collected includes monitoring recent purchases made by the user.

Another aspect of the disclosure may be where analyzing the user data to assign the pickup score to the user includes monitoring for at least one time of purchase made by the user.

Another aspect of the disclosure may be where analyzing the user data to assign the pickup score to the user includes monitoring calendar events of the user occurring within a predetermined range of time.

Another aspect of the disclosure may be where analyzing the user data to assign the pickup score to the user includes monitoring travel plans of the user occurring within a predetermined range of time.

Another aspect of the disclosure may be where analyzing the user data to assign the pickup score to the user includes monitoring a location of at least one personal electronic device associated with the user.

Another aspect of the disclosure may be where the at least one personal electronic device includes a mobile device or a GPS enabled device.

Another aspect of the disclosure may be where analyzing the user data to assign the pickup score to the user includes identifying a location of the user and determining an average time a visitor remains at the location.

Another aspect of the disclosure may be where the location includes a place of commerce.

Another aspect of the disclosure may be where determining the parking position for the autonomous vehicle includes tracking the user with at least one sensor on the autonomous vehicle to identify an object being transported by the user.

Another aspect of the disclosure may be where the at least one sensor includes a camera.

Disclosed herein is a non-transitory computer-readable storage medium embodying programmed instructions which, when executed by a processor, are operable for performing a method. The method includes collecting user data regarding a user of the autonomous vehicle and analyzing the user data to assign a pickup score to the user for determining when to relocate the autonomous vehicle from a first parking location. The autonomous vehicle is directed to relocate from the first parking location when the pickup score exceeds a predetermined threshold. A second parking location and a parking position are determined for the autonomous vehicle at a pickup location based on the user data when relocating the autonomous vehicle to pick up the user.

Disclosed herein is a system for an autonomous vehicle. The system includes a plurality of sensors and a controller in communication with the plurality of sensors. The controller is configured to direct the autonomous vehicle from a first parking location when a pickup score determined for a user of the autonomous vehicle exceeds a first predetermined threshold. The controller is also configured to direct the autonomous vehicle to a second parking location with a predetermined parking position at a pickup location based on user data collected.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
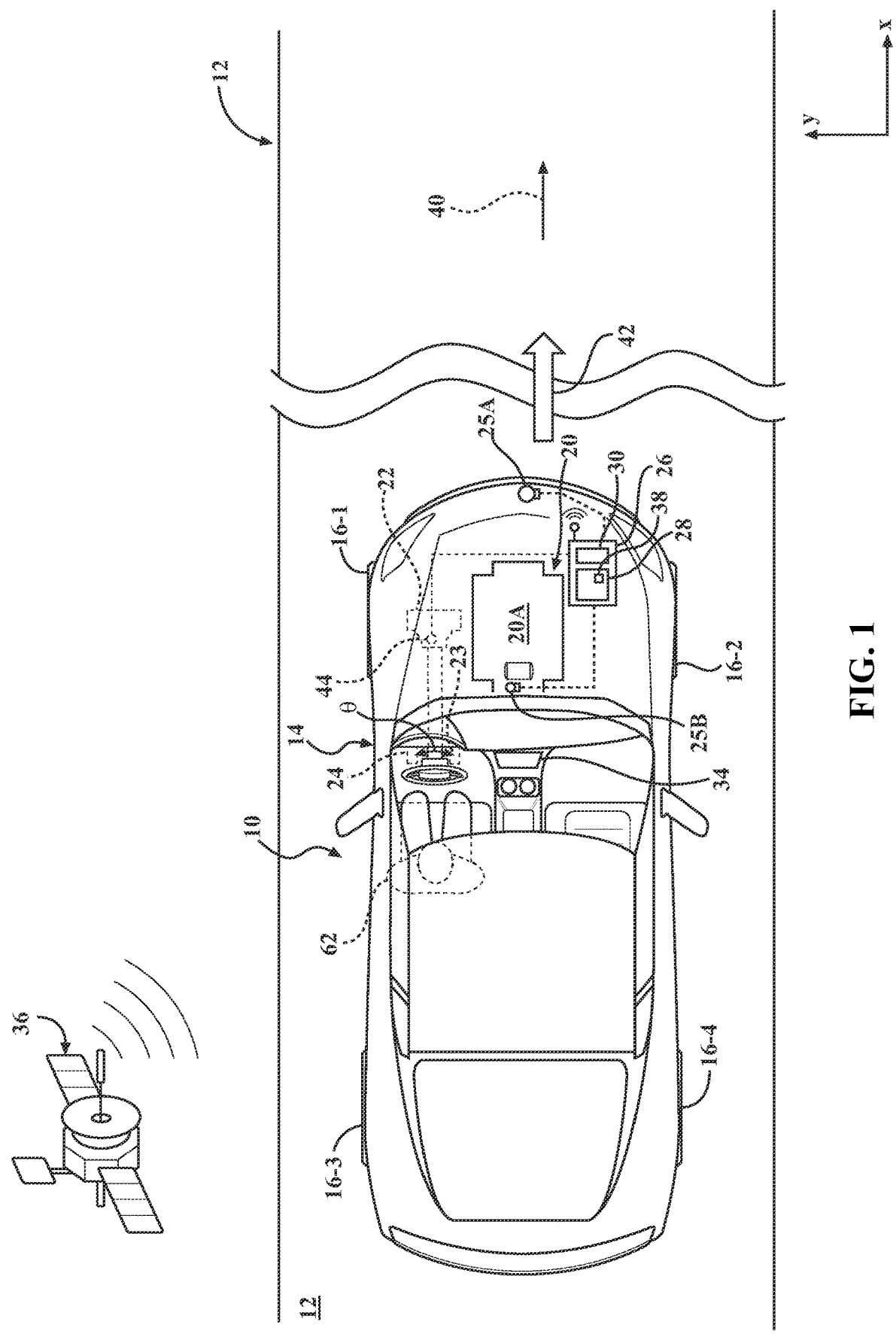
FIG. 1 is a schematic illustration of an example motor vehicle.

Referring to the FIGS., wherein like numerals indicate like parts referring to the drawings, wherein like reference numbers refer to like components, FIG. 1 shows a schematic view of a motor vehicle 10 positioned relative to a road surface, such as a vehicle lane 12. As shown in FIG. 1, the vehicle 10 includes a vehicle body 14 enclosing a user 62, a first axle having a first set of road wheels 16-1, 16-2, and a second axle having a second set of road wheels 16-3, 16-4 (such as individual left-side and right-side wheels on each axle). Each of the road wheels 16-1, 16-2, 16-3, 16-4 employs tires configured to provide fictional contact with the vehicle lane 12. Although two axles, with the respective road wheels 16-1, 16-2, 16-3, 16-4, are specifically shown, nothing precludes the motor vehicle 10 from having additional axles.

As shown in FIG. 1, a vehicle suspension system operatively connects the vehicle body 14 to the respective sets of road wheels 16-1, 16-2, 16-3, 16-4 for maintaining contact between the wheels and the vehicle lane 12, and for maintaining handling of the motor vehicle 10. The motor vehicle 10 additionally includes a drivetrain 20 having a power-source or multiple power-sources 20A, which may be an internal combustion engine (ICE), an electric motor, or a combination of such devices, configured to transmit a drive torque to the road wheels 16-1, 16-2 and/or the road wheels 16-3, 16-4. The motor vehicle 10 also employs vehicle operating or control systems, including devices such as one or more steering actuators 22 (for example, an electrical power steering unit) configured to steer the road wheels 16-1, 16-2, a steering angle (θ), an accelerator device 23 for controlling power output of the power-source(s) 20A, a braking switch or device 24 for retarding rotation of the road wheels 16-1 and 16-2 (such as via individual friction brakes located at respective road wheels), etc.

As shown in FIG. 1, the motor vehicle 10 includes at least one sensor 25A and an electronic controller 26 that cooperate to at least partially control, guide, and maneuver the vehicle 10 in an autonomous mode during certain situations. As such, the vehicle 10 may be referred to as an autonomous vehicle. To enable efficient and reliable autonomous vehicle control, the electronic controller 26 may be in operative communication with the steering actuator(s) 22 configured as an electrical power steering unit, accelerator device 23, and braking device 24. The sensors 25A of the motor vehicle 10 are operable to sense the vehicle lane 12 and monitor a surrounding geographical area and traffic conditions proximate the motor vehicle 10.

The sensors 25A of the vehicle 10 may include, but are not limited to, at least one of a Light Detection and Ranging (LIDAR) sensor, radar, and camera located around the vehicle 10 to detect the boundary indicators, such as edge conditions, of the vehicle lane 12. The type of sensors 25A, their location on the vehicle 10, and their operation for detecting and/or sensing the boundary indicators of the vehicle lane 12 and monitor the surrounding geographical area and traffic conditions are understood by those skilled in the art, are not pertinent to the teachings of this disclosure, and are therefore not described in detail herein. The vehicle 10 may additionally include sensors 25B attached to the vehicle body and/or drivetrain 20.

The electronic controller 26 is disposed in communication with the sensors 25A of the vehicle 10 for receiving their respective sensed data related to the detection or sensing of the vehicle lane 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 25A and 25B), etc., for managing and controlling the operation of the vehicle 10. As such, a method, described below and generally represented in FIG. 3, may be embodied as a program or algorithm partially operable on the electronic controller 26. It should be appreciated that the electronic controller 26 may include a device capable of analyzing data from the sensors 25A and 25B, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 26 includes a tangible, non-transitory memory 30 on which computer-executable instructions, including one or more algorithms, are recorded for regulating operation of the motor vehicle 10. The subject algorithm(s) may specifically include an algorithm configured to monitor localization of the motor vehicle 10 and determine the vehicle's heading relative to a mapped vehicle trajectory on a particular road course to be described in detail below.

The motor vehicle 10 also includes a vehicle navigation system 34, which may be part of integrated vehicle controls, or an add-on apparatus used to find travel direction in the vehicle. The vehicle navigation system 34 is also operatively connected to a global positioning system (GPS) 36 using an earth orbiting satellite. The vehicle navigation system 34 in connection with the GPS 36 and the above-mentioned sensors 25A may be used for automation of the vehicle 10. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. The current position of a vehicle 10 may be calculated via dead reckoning—by using a previously determined position and advancing that position based upon given or estimated speeds over elapsed time and course by way of discrete control points.

The electronic controller 26 is generally configured, i.e., programmed, to determine or identify localization 38 (current position in the X-Y plane, shown in FIG. 1), velocity, acceleration, yaw rate, as well as intended path 40, and heading 42 of the motor vehicle 10 on the vehicle lane 12. The localization 38, intended path 40, and heading 42 of the motor vehicle 10 may be determined via the navigation system 34 receiving data from the GPS 36, while velocity, acceleration (including longitudinal and lateral g's), and yaw rate may be determined from vehicle sensors 25B. Alternatively, the electronic controller 26 may use other systems or detection sources arranged remotely with respect to the vehicle 10, for example a camera, to determine localization 38 of the vehicle relative to the vehicle lane 12.

As noted above, the motor vehicle 10 may be configured to operate in an autonomous mode guided by the electronic controller 26. In such a mode, the electronic controller 26 may further obtain data from vehicle sensors 25B to guide the vehicle along the desired path, such as via regulating the steering actuator 22. The electronic controller 26 may be additionally programmed to detect and monitor the steering angle (θ) of the steering actuator(s) 22 along the desired path 40, such as during a negotiated turn. Specifically, the electronic controller 26 may be programmed to determine the steering angle (θ) via receiving and processing data signals from a steering position sensor 44 (shown in FIG. 1) in communication with the steering actuator(s) 22, accelerator device 23, braking device 24.

Figure 2:
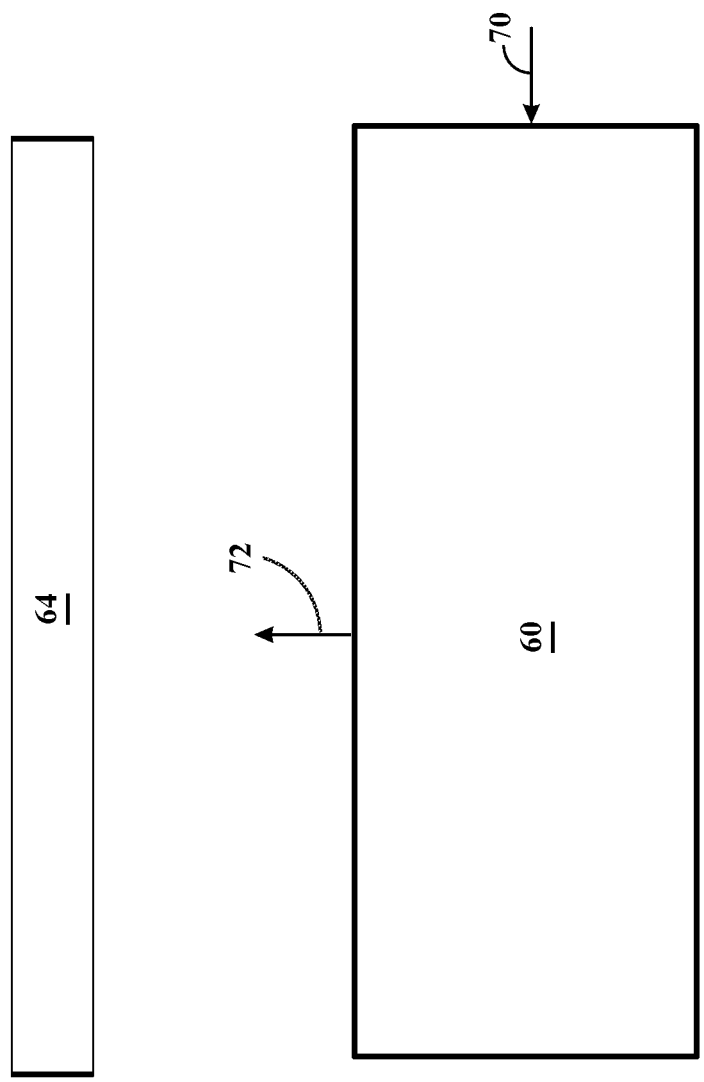
FIG. 2 illustrates an example infrastructure with parking zones for the motor vehicle of FIG. 1.
Figure 2:

FIG. 2 illustrates an example parking infrastructure 60 having an entrance 70 and an exit 72 and being adjacent at least one buffer parking zone 64 and at least one pickup parking zone 66. In the illustrated example, the buffer parking zone 64 functions as an intermediate parking area for the motor vehicle 10 between a main parking zone within the parking infrastructure 60 and the pickup parking zone 66 adjacent a point of interest 68, such as a building or place of commerce. This configuration allows the motor vehicle 10 to transition from the parking infrastructure 60 to the buffer parking zone 64 for a length of time prior to the user 62 being ready for picked up by the motor vehicle 10 within the pickup parking zone 66. By moving the motor vehicle 10 to the buffer parking zone 64, delays caused by the motor vehicle 10 leaving the parking infrastructure 60 can be reduced.

Figure 3:
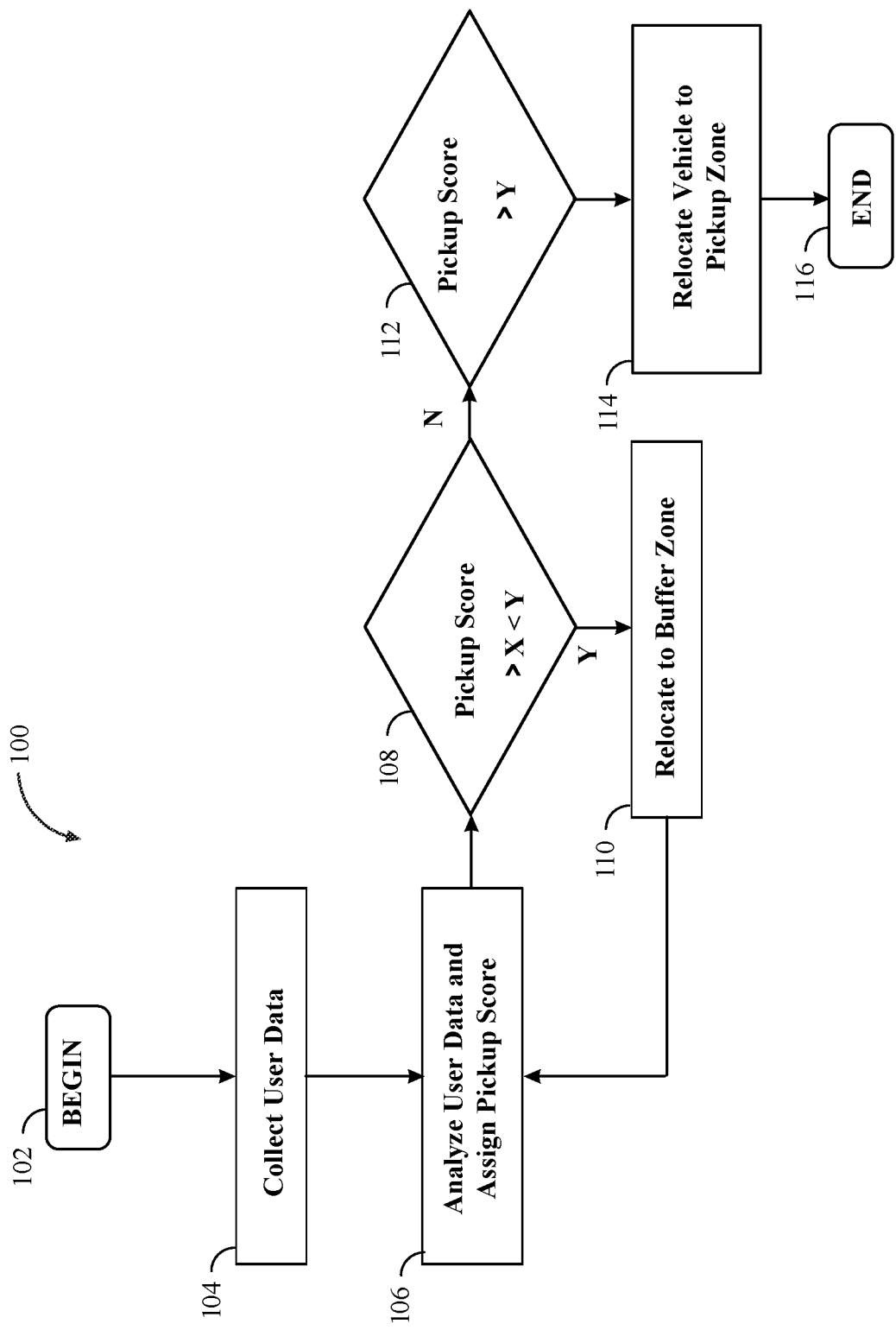
FIG. 3 illustrates an example flow for determining when to pick up a user of the motor vehicle of FIG. 1.

FIG. 3 illustrates an example method 100 for determining when to pick up the user 62 of the motor vehicle 10. In the illustrated example, the method 100 begins at Block 102 and proceeds to Block 104 where the method 100 collects user data regarding the user 62 of the motor vehicle 10. In one example, the user data can include calendared events, such as a start or an end time of an appointment, departure or arrival travel times, a geographic location of the user 62, such as tracking the location of the user 62 relative to an exit of a building or a checkout area in a store.

The user 62 can be tracked by monitoring a GPS position of a mobile device or GPS enabled device, such as a smart watch, associated with the user 62. The user data is continuously collected to provide the method 100 with the most current activities of the user 62 to provide insight into when the user 62 may be ready for pickup. The method 100 can also collect the user data through infrastructure (V2X) communications, ultra-wide band (UWB) communications, or obtain the user data from another source, such as over the internet.

Further, the user data collected can include historic travel patterns of the user 62 or an average arrival time or departure time for the user 62 from a given location. Alternatively, the user data could include recent transactions made by the user 62, such as making an electronic payment to purchase an item, which would indicate an approaching pickup time for the user 62. Additionally, the method 100 can obtain crowd sourced information regarding a location of the user 62, such as an average time a visitor remains at the location.

Once some user data has been collected at Block 104 relevant to the user 62 needing to be picked up by the autonomous vehicle 10, the method 100 then proceeds to Block 106 for analyzing the user data and assigning a pickup score for the user 62 based on the user data currently collected. The user data is analyzed to determine when to direct the motor vehicle 10 to relocate from the parking infrastructure 60.

As the method 100 continuously collects the user data from Block 104, Block 106 analyzes the data to assign a current or updated pickup score for the user. In one example, if the user data analyzed indicates the user 62 recently made a purchase, a higher score pickup score is assigned for the user 62 that may indicate that a time to pick up the user 62 is approaching. With the pickup score calculated, the method 100 proceeds to Block 108 to determine if the motor vehicle 10 should be directed to relocate based on the pickup score.

At Block 108, the method 100 compares the pickup score for the user 62 to a first predetermined range of pickup scores. In the illustrated example, the first predetermined range of pickup scores includes scores greater than a pickup score of X and less than a pickup score of Y. If the pickup score assigned from Block 106 is within the first predetermined range of pickup scores, then the method 100 will proceed to Block 110.

At Block 110, the motor vehicle 10 is directed to relocate from the parking infrastructure 60 or a first parking location, to an intermediate location in the buffer parking zone 64 in anticipation of the user 62 being ready for pickup at a pickup location within the pickup zone 66. At this point, the method 100 returns to Block 106 for further analysis of user data to generate an updated or current pickup score for determining how to direct the motor vehicle 10 for picking up the user 62.

With the current or updated pickup score, the method 100 proceeds to Block 108 to compare the pickup score to the first predetermined range of pickup scores. If the updated pickup score exceeds the first predetermined range of pickup scores in Block 108, the method 100 proceeds to Block 112.

At Block 112, the method 100 compares the current or updated pickup score to a second predetermined range of pickup scores. In the illustrated example, the second predetermined range of pickup scores includes scores greater than a pickup score of Y. The second predetermined range of pickup scores indicates that a status of the user 62 is ready for pickup such that the motor vehicle 10 should be directed to relocate to a parking location within the pickup parking zone 66. The method 100 then proceeds to Block 114 to direct the motor vehicle 10 to relocate from either the parking infrastructure 60 or the buffer parking zone 64 to the pickup location within the pickup zone 66. While the above examples direct the motor vehicle 10 to relocate to the buffer parking zone 64 based on the initial pickup score, the motor vehicle 10 can proceed from the parking infrastructure 60 directly to the pickup location within the pickup parking zone 66 without relocating to an intermediate parking location within the buffer parking zone 64. Before the motor vehicle 10 can be relocated to the pickup parking zone 66, the parking location and positioning of the motor vehicle 10 within the pickup parking zone 66 should be determined.

Figure 4:
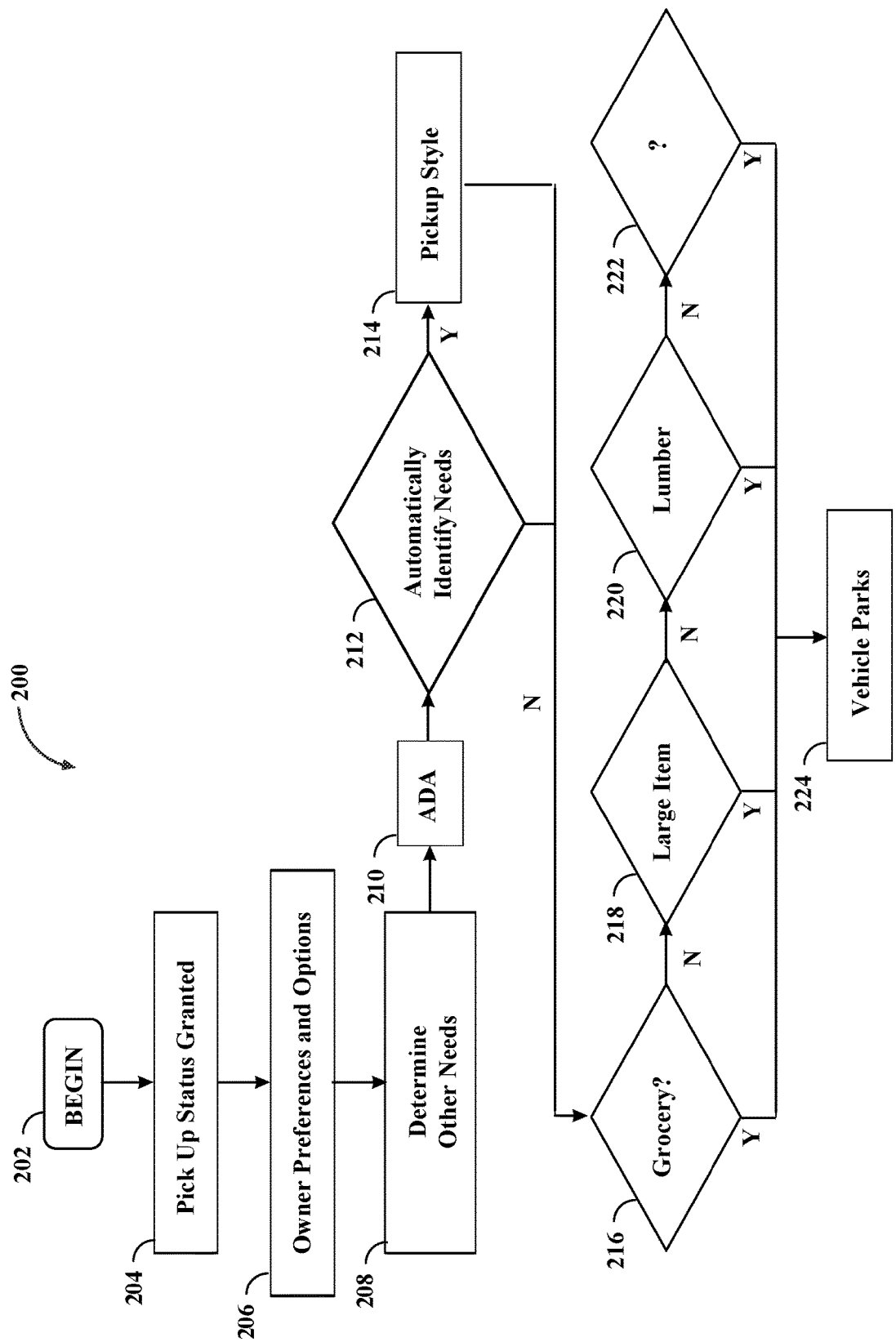
FIG. 4 illustrates an example flow for determining a parking configuration for the motor vehicle of FIG. 1.

With the pickup status granted for the user 62, the parking location and position of the motor vehicle 10 is determined as illustrated by the method 200 shown in FIG. 4. Determining the parking location and position for the motor vehicle 10 with the method 200 begins at Block 202 and proceeds to Block 204 with a confirmation of the pickup status being granted as discussed above.

The method 200 then determines if the user 62 created preferences or pre-determined options for parking to implement within the pickup parking zone 66 at Block 206. For example, the preferences or predetermined options could include parking in a space within a predetermined distance from a store exit or providing additional room in the parking space for one side of the motor vehicle 10 over the other. Once the preferences or predetermined options are determined, the method 200 proceeds to Block 208 to determine if the user has additional needs.

At Block 208, the user data is further analyzed to identify parking needs of the user 62. In particular, the method 200 can analyze purchase records of the user 62 to determine a size or type of item purchased. The method 200 can also determine if the user 62 may have ADA (Americans with Disabilities Act) needs that require a specific parking space or orientation of the motor vehicle 10 at the pickup location at Block 210.

The method 200 then proceeds to Block 212 to attempt to automatically identify parking needs of the user 62 based on the user data. If the method 200 can automatically identify the parking needs at Block 212, the method 200 proceeds to Block 214 to assign a predetermined pickup style based on the automatically identified needs. In one example, the predetermined pickup style includes a parking location and position for the motor vehicle 10.

Alternatively, if the method 200 cannot automatically identify the parking needs, the user 62 can select a predetermined parking position from a number of predetermined options, such as Block 216 (grocery), Block 218 (large item), Block 220 (lumber), or a customized parking position in Block 222. In the case of lumber or large items, the predetermined parking position for the motor vehicle 10 may include a parking location near an exit of the building and a position of the motor vehicle 10 that allows for trunk access towards the building to avoid the user 62 having to walk around the motor vehicle 10.

The cameras on the motor vehicle 10 can also be used to identify objects being transported by the user 62 while the user 62 is approaching the motor vehicle 10 to determine a custom parking position for the user 62. For example, if the cameras associated with the sensors 25A, 25B determines that the user 62 is carrying a large package, a parking position will be selected that accommodates placing the package in the motor vehicle 10, such as reversing into the pickup location or opening the trunk as the user 62 approaches. The cameras can also work in connection with the mobile device or GPS enabled device associated with the user 62 to improve tracking of the user 62 approaching the motor vehicle 10.

The method 100 can then proceed to Block 116 once the parking location and position are determined and the motor vehicle 10 is parked at Block 224 to end the methods.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating an autonomous vehicle, the method comprising:
assigning an initial pickup score to a user of the autonomous vehicle for determining when to relocate the autonomous vehicle from a first parking location is based on analyzing user data collected regarding a location of the user relative to at least one of an exit of a current location of the user or a checkout area of the current location;
controlling the autonomous vehicle to relocate from the first parking location when the initial pickup score exceeds an initial predetermined threshold; and
determining a second parking location and a parking position for the autonomous vehicle at the second parking location based on the user data when relocating the autonomous vehicle to pick up the user.

2. The method of claim 1, wherein controlling the autonomous vehicle to relocate from the first parking location when the initial pickup score exceeds the initial predetermined threshold includes controlling the autonomous vehicle to relocate to an intermediate parking location within a buffer parking zone prior to controlling the autonomous vehicle to relocate from the intermediate parking location to the second parking location.

3. The method of claim 2, wherein controlling the autonomous vehicle to relocate from the intermediate parking location to the second parking location is based on an updated pickup score assigned to the user that exceeds an updated predetermined threshold with the updated pickup score based on a recent purchase by the user when the autonomous vehicle is located at either the first parking location or after the autonomous vehicle has relocated from the first parking location.

4. The method of claim 1, wherein determining the second parking location and the parking position at the second parking location for the autonomous vehicle is based on identifying at least one predetermined user preference.

5. The method of claim 1, wherein determining the second parking location and the parking position at the second parking location for the autonomous vehicle is based on identifying a loading requirement for the autonomous vehicle with the loading requirement being determined automatically by monitoring recent purchases by the user when the autonomous vehicle is located at either the first parking location or after the autonomous vehicle has relocated from the first parking location.

6. The method of claim 1, wherein analyzing the user data to assign the initial pickup score to the user includes monitoring for at least one time of purchase made by the user when a personal electronic device associated with the user is located in a place of commerce determined by a GPS location of the personal electronic device and the at least one time of purchase occurs when the autonomous vehicle is located at either the first parking location or after the autonomous vehicle has relocated from the first parking location.

7. The method of claim 1, wherein analyzing the user data to assign the initial pickup score to the user includes monitoring calendar events of the user occurring within a predetermined range of time.

8. The method of claim 1, wherein analyzing the user data to assign the initial pickup score to the user includes monitoring travel plans of the user occurring within a predetermined range of time.

9. The method of claim 1, wherein analyzing the user data to assign the initial pickup score to the user includes monitoring the current location of at least one personal electronic device associated with the user.

10. The method of claim 9, wherein the at least one personal electronic device includes a mobile device or a GPS enabled device.

11. The method of claim 1, wherein analyzing the user data to assign the initial pickup score to the user includes determining an average time a visitor remains at the current location.

12. The method of claim 11, wherein the location includes a place of commerce.

13. The method of claim 1, wherein determining the parking position for the autonomous vehicle includes tracking the user with at least one sensor on the autonomous vehicle to identify an object being transported by the user.

14. The method of claim 13, wherein the at least one sensor includes a camera.

15. The method of claim 1, wherein assigning the initial pickup score to the user is based on analyzing user data collected regarding a recent purchase by the user when the autonomous vehicle is located at either the first parking location or after the autonomous vehicle has relocated from the first parking location.

16. A non-transitory computer-readable storage medium embodying programmed instructions which, when executed by a processor, are operable for performing a method comprising:
assigning an initial pickup score to a user of an autonomous vehicle for determining when to relocate the autonomous vehicle from a first parking location is based on analyzing user data collected regarding a relative location of the user relative to at least one of an exit of a current location of the user or a checkout area of the current location;
controlling the autonomous vehicle to relocate from the first parking location when the initial pickup score exceeds an initial predetermined threshold; and
determining a second parking location and a parking position for the autonomous vehicle at the second parking location based on the user data when relocating the autonomous vehicle to pick up the user.

17. The storage medium of claim 16, wherein controlling the autonomous vehicle to relocate from the first parking location when the initial pickup score exceeds the initial predetermined threshold includes controlling the autonomous vehicle to relocate to an intermediate parking location within a buffer parking zone prior to controlling the autonomous vehicle to relocate from the intermediate parking location to the second parking location.

18. The storage medium of claim 17, wherein controlling the autonomous vehicle to relocate from the intermediate parking location to the second parking location is based on an updated pickup score is assigned to the user that exceeds an updated predetermined threshold with the updated pickup score is based at least partially on a recent purchase by the user when the autonomous vehicle is located at either the first parking location or after the autonomous vehicle relocated from the first parking location.

19. A system for an autonomous vehicle comprising:
a plurality of sensors;
a controller in communication with the plurality of sensors, the controller configured to:
assign an initial pickup score to a user of an autonomous vehicle for determining when to relocate the autonomous vehicle from a first parking location is based on analyzing user data collected regarding a relative location of the user relative to at least one of an exit of a current location of the user or a checkout area of the current location;
control the autonomous vehicle to relocate from a first parking location when an initial pickup score exceeds an initial predetermined threshold; and
determine a second parking location and a parking position for the autonomous vehicle at the second parking location based on the user data when relocating the autonomous vehicle to pick up the user.

20. The system of claim 19, wherein the controller is configured to control the autonomous vehicle to relocate from the first parking location when the initial pickup score exceeds the initial predetermined threshold by controlling the autonomous vehicle to relocate to an intermediate parking location within a buffer parking zone prior to controlling the autonomous vehicle to relocate to the second parking location based on an updated pickup score assigned to the user that exceeds an update predetermined threshold with the updated pickup score based at least partially on a recent purchase by the user when the autonomous vehicle is located at either the first parking location or after the autonomous vehicle relocated from the first parking location.

* * * * *